United States Patent
Horiuchi

(10) Patent No.: US 8,447,471 B2
(45) Date of Patent: May 21, 2013

(54) VEHICLE DRIVEABILITY CONTROL SYSTEM

(75) Inventor: Yutaka Horiuchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 280 days.

(21) Appl. No.: 12/921,688

(22) PCT Filed: Feb. 16, 2009

(86) PCT No.: PCT/JP2009/000598
§ 371 (c)(1),
(2), (4) Date: Sep. 9, 2010

(87) PCT Pub. No.: WO2009/113242
PCT Pub. Date: Sep. 17, 2009

(65) Prior Publication Data
US 2011/0040447 A1    Feb. 17, 2011

(30) Foreign Application Priority Data

Mar. 10, 2008  (JP) ................................. 2008-059218

(51) Int. Cl.
*B62D 6/00* (2006.01)
*G05D 1/00* (2006.01)

(52) U.S. Cl.
USPC ............................................. 701/42; 701/41

(58) Field of Classification Search
USPC ................ 701/41–42; 180/422, 424; 340/439
See application file for complete search history.

(56) References Cited

U.S. PATENT DOCUMENTS

| | | | |
|---|---|---|---|
| 5,615,117 A | 3/1997 | Serizawa | |
| 5,991,675 A | 11/1999 | Asanuma | |
| 2007/0145819 A1 | 6/2007 | Lin et al. | |
| 2007/0290867 A1* | 12/2007 | Kuramori et al. | 340/576 |
| 2010/0023217 A1 | 1/2010 | Horiuchi et al. | |

FOREIGN PATENT DOCUMENTS

| | | |
|---|---|---|
| DE | 102005034936 A1 | 2/2007 |
| EP | 1052161 A2 | 11/2000 |
| WO | 2004103798 A1 | 12/2004 |

\* cited by examiner

*Primary Examiner* — Thomas Tarcza
*Assistant Examiner* — Kevin Myhre
(74) *Attorney, Agent, or Firm* — Rankin, Hill & Clark LLP

(57) ABSTRACT

In a vehicle driveability control system for determining a control variable that is applied to a vehicle for a given control input including a front wheel steering angle according to a response of a vehicle model (10) to the given input, a parameter of the vehicle model is changed according to an output of a vehicle operator skill determining unit (14). Thereby, the vehicle driveability control system can provide a driving property that suits the driving skill of the particular vehicle operator, and can satisfy vehicle operators of all skill levels. In particular, if the vehicle operator is skilled enough to cope with emergency situations, the vehicle is enabled to respond to a quick input with a high responsiveness. Also, the control system is able to adapt itself to an improvement in the skill of a vehicle operator over time.

3 Claims, 5 Drawing Sheets

VEHICLE DRIVEABILITY CONTROL SYSTEM

TECHNICAL FIELD

The present invention relates to a vehicle driveability control system that can adapt control parameters of a vehicle to a driving skill of the vehicle operator.

BACKGROUND OF THE INVENTION

As a measure for stabilizing the behavior of a vehicle, various forms of rear wheel toe angle control devices (RTCs) have been proposed, and the toe angles of the right and left rear wheels are steered symmetrically (in opposite phase) or asymmetrically (in same phase) so that the vehicle may be given with a desired dynamic property. A control device disclosed in Japanese patent No. 3179271 stabilizes the behavior of the vehicle by using a four wheel steering (4WS) device that sets a target of bringing a lateral slip angle of the vehicle to zero or a prescribed value. Various control processes for such a device have also been proposed, and one of them changes a steering angle ratio between the front and rear wheels depending on the vehicle speed (opposite phase in a low speed range and same phase in a high speed range). Such a control process, be it an RTC or 4WS, basically relies on a feed forward control that minimizes a deviation of a yaw rate response of an actual vehicle model to a steering input from a yaw response of an ideal vehicle model to the same steering input.

FIG. 1 shows an example of such a RTC device. As a front wheel steering angle $\delta_f$ is inputted to both an actual vehicle model ($G_{y0}(s)$) 11 and an ideal vehicle model ($G_{ideal}(s)$) 10, a deviation between the outputs of the two models is forwarded to a RTC feed forward transfer (F/F) function property (P(s)) 12. An output of the RTC F/F function property (P(s)) 12 acts upon a vehicle 13 as an added yaw moment, and an integrated value of the sum of the yaw moment of the vehicle owing to a front wheel steering angle and the added yaw moment is given as a cause of an actual yaw rate of the vehicle. By using a feed forward control process using the behavior of the ideal vehicle model as a reference, the driving stability of the vehicle can be improved and a high responsiveness can be achieved at the same time.

In this case, as disclosed in WO08/047,481, the motion of equation of a vehicle having a transfer function property of $\delta_r = G_r \cdot \delta_f$ can be given by the following equation.

$$\begin{bmatrix} m \cdot V \cdot s + (K_f + K_r) & mV + \dfrac{l_f \cdot K_f - l_r \cdot K_r}{V} \\ l_f \cdot K_f - l_r \cdot K_r & I \cdot s + \dfrac{l_f^2 \cdot K_f - l_r^2 \cdot K_r}{V} \end{bmatrix} \cdot \begin{bmatrix} \beta \\ \gamma \end{bmatrix} = \begin{bmatrix} K_f + Gr \cdot K_r \\ l_f \cdot K_f - Gr \cdot l_r \cdot K_r \end{bmatrix} \cdot \delta_f$$

The steering angle $\delta_r$ of the rear wheel can be given by the following equation.

$$\delta_r = -\frac{\dfrac{m \cdot l_f}{k_r \cdot l} V \cdot s + 1}{\dfrac{m \cdot l_r}{k_f \cdot l} V \cdot s + 1} \cdot \frac{1}{G_{\gamma 0}} (G_{ideal} - G_{\gamma 0}) \cdot \delta_f \quad (1)$$

where m: vehicle mass, l: wheel base, $1f$ and $1r$: distances of front and rear axles from the gravitational center, $\delta_f$: front wheel steering angle, Kf and Kr: cornering powers of front and rear wheels, and V: vehicle speed. $G_{ideal}$ represents the ideal vehicle model, and $G_{y0}$ represents the actual vehicle model when $\delta_r = 0$ in FIG. 1.

Because a vehicle is typically considered to be easy to drive when the delay of the yaw rate to a steering, input is small, and the response speed is high, it is preferable to determine $G_{ideal}$ such that the resonance gain for the response $G_{y0}$ when no control is made is relatively low, and raise the frequency range that is damped (thereby maintain a high tracking performance up to a high frequency range) to a higher range.

However, a skilled vehicle operator is able to compare the response of a vehicle to a given steering input to a reference vehicle which is formed from past experience, and is therefore able to quickly grasp the relationship between the control input and resulting response. Therefore, a skilled vehicle operator is able to handle the vehicle even when the response of the vehicle is highly prompt, and tends to prefer a vehicle having a quick response. On the other hand, an unskilled vehicle operator is unable to predict the response of the vehicle to a given steering input, and decides how to operate the steering wheel after observing how the vehicle is responding to a steering input. Therefore, an unskilled vehicle operator tends to excessively turn the steering wheel, and often reverses a steering action while making a turn to compensate for excessive turning of the steering wheel.

Therefore, when a device that can affect the driveability of the vehicle such as an RTC device is designed according to a certain design criterion, it does not necessarily satisfy all the users. Therefore, some compromise is unavoidable in determining the ideal vehicle model $G_{ideal}$ for such a device, and the final result is often unsatisfactory to skilled vehicle operators. In particular, a prompt response of a vehicle to a steering input is desired in a situation when avoiding a dangerous situation. Also, as the skill of a vehicle operator advances over time, the vehicle operator tends to prefer a vehicle demonstrating a quick response more and more.

BRIEF SUMMARY OF THE INVENTION

In view of such problems of the prior art, a primary object of the present invention is to provide a vehicle driveability control system that can adapt itself to various skill levels of vehicle operators.

A second object of the present invention is to provide a vehicle driveability control system that allows benefits of a highly responsive driving property of a vehicle to be available when desired.

According to the present invention, such an object can be accomplished by providing a vehicle driveability control system for determining a control variable that is applied to a vehicle for a given control input including a front wheel steering angle according to a response of a vehicle model to the given input, comprising: a vehicle operator skill determining unit; and a control unit for changing a parameter of the vehicle model according to an output of the vehicle operator skill determining unit.

Thereby, the vehicle driveability control system can provide a driving property that suits the driving skill of the particular vehicle operator, and can satisfy vehicle operators of all skill levels. In particular, if the vehicle operator is skilled enough to cope with emergency situations, the vehicle is enabled to respond to a quick input with a high responsiveness. Also, the control system is able to adapt itself to an improvement in the skill of a vehicle operator over time.

According to the preferred embodiment of the present invention, the system comprises an ideal vehicle model, an actual vehicle model and a feed forward control unit that determines the control variable according to a deviation of an output of the actual vehicle model from an output of the ideal vehicle model; a parameter of the ideal vehicle model being changed according to the output of the vehicle operator skill determining unit.

The driving skill of a vehicle operator can be measured in a number of different ways. For instance, the vehicle operator skill determining unit may comprise a corrective steering determining unit to count a number of changes in a sign of a steering speed while a yaw movement of the vehicle continues with a same sign.

Typically, the control variable that is applied to the vehicle comprises a yaw moment. For instance, the vehicle may comprises a rear toe control unit for applying a yaw moment to the vehicle as the control variable.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
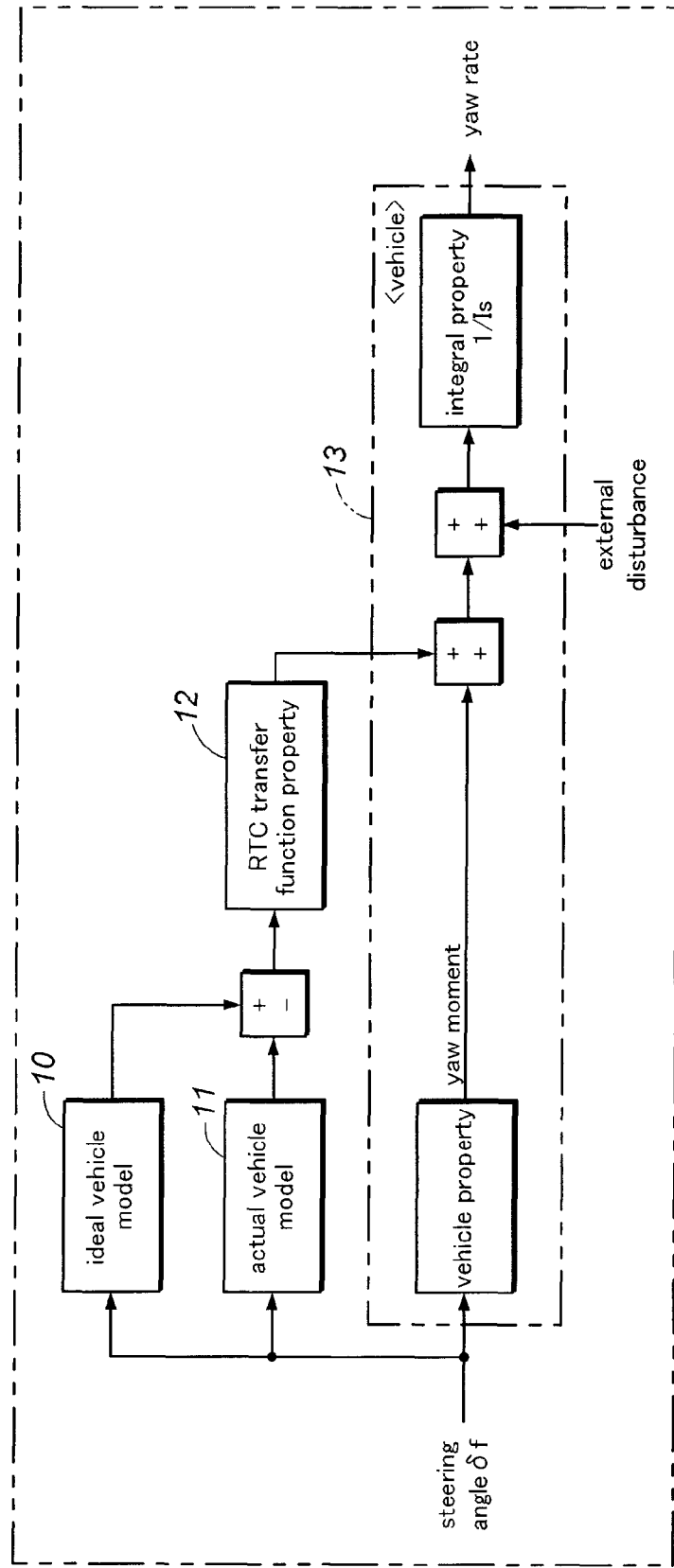
FIG. 1 is a block diagram of a conventional vehicle driveability control system.
Figure 2:
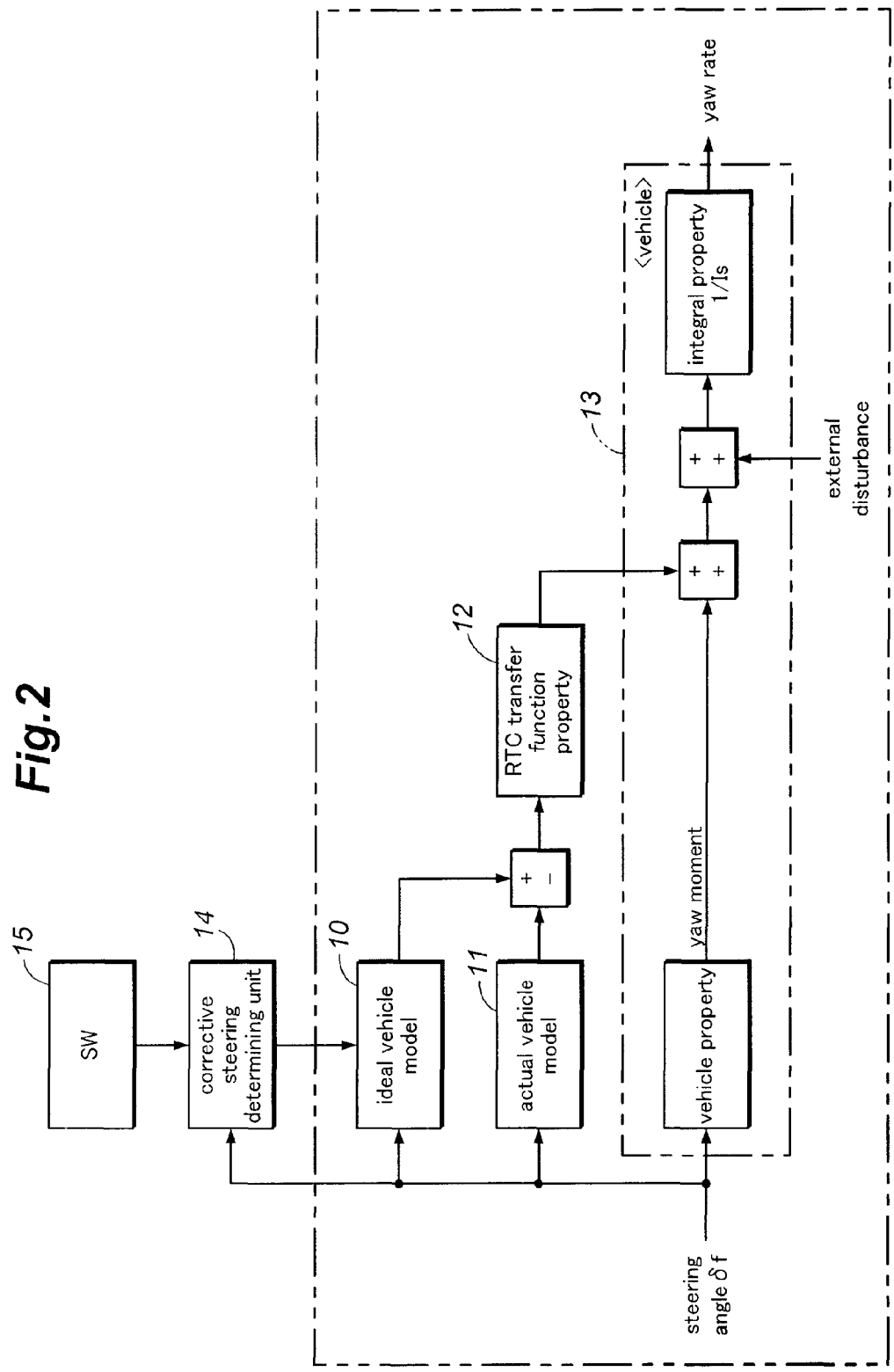
FIG. 2 is a block diagram of a vehicle driveability control system embodying the present invention.

FIG. 2 shows a block diagram of a vehicle driveability control system embodying the present invention. In FIG. 2, the parts corresponding to those in FIG. 1 are denoted with like numerals without repeating the description of such parts. The illustrated embodiment additionally comprises a corrective steering determining unit 14 that receives a front wheel steering angle $\delta_f$ and an actual yaw rate $\gamma$ of the vehicle, and changes a parameter of an ideal vehicle model 10 according to the inputs. The system further comprises a manual switch 15 for turning on and off the operation of the corrective steering determining unit 14 as desired.

Figure 3:
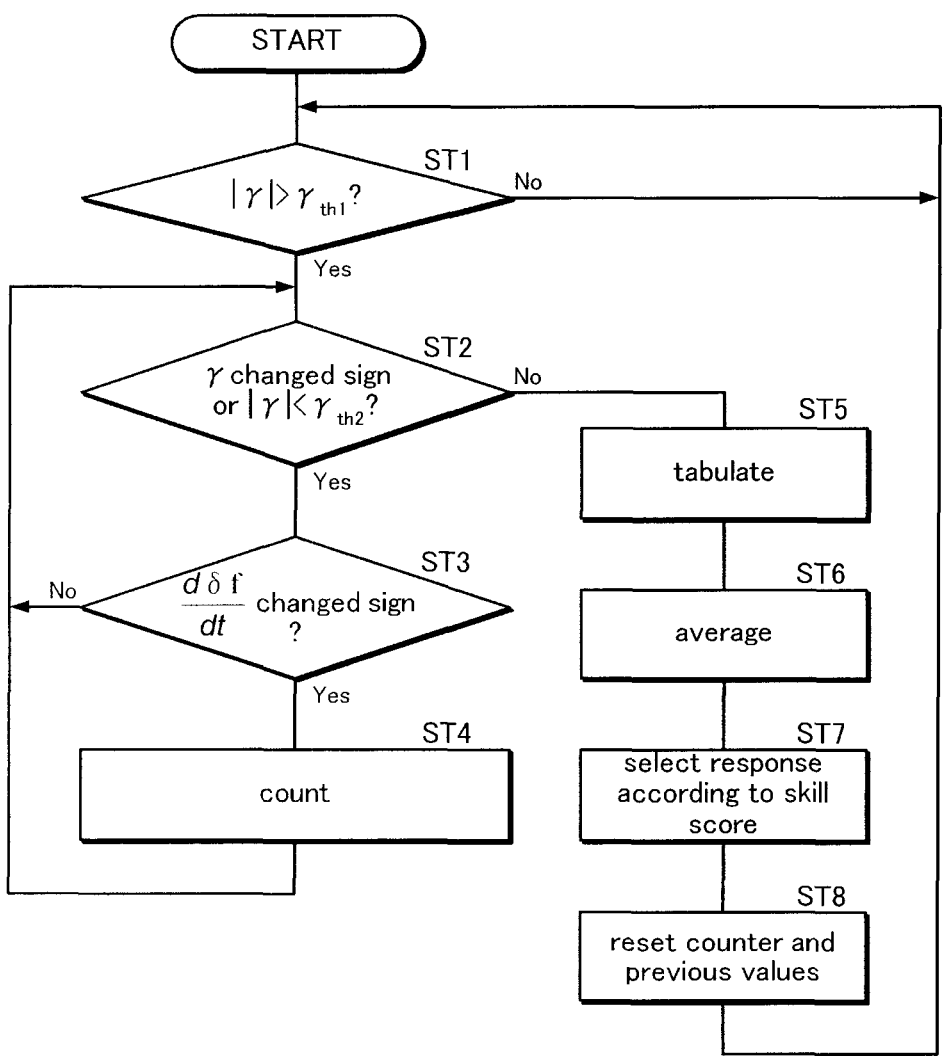
FIG. 3 is a flowchart of a process flow in a corrective steering determining unit of the vehicle driveability control system of the present invention.

FIG. 3 is a flowchart showing the process flow executed by the corrective steering determining unit 14. When the vehicle is traveling straight ahead, the skill of the vehicle operator is not evaluated. Driving a vehicle straight ahead does not require a driving skill. In other words, the absolute value of the yaw rate $\gamma$ is compared with a first threshold value $\gamma_{th1}$, and unless $|\gamma| > \gamma_{th1}$, the skill of the vehicle operator is not evaluated (step ST1: no), and the process flow returns to step ST1. When the absolute value of the yaw rate $\gamma$ is greater than the first threshold value $\gamma_{th1}$ (step ST1: yes) such as when the vehicle is turning or changing lanes, the program flow advances to step ST2 to evaluate the skill of the vehicle operator. In step ST2, the sign of the yaw rate $\gamma$ is compared with that of the previous value, and the absolute value of the yaw rate $\gamma$ is compared with a second threshold value $\gamma_{th2}$. The second threshold value $\gamma_{th2}$ may be equal to or smaller than the first threshold value $\gamma_{th1}$.

If there was a change in the sign of the yaw rate $\gamma$ or the absolute value of the yaw rate $\gamma$ is smaller than the second threshold value in step ST2, the program flow advances to step ST3. In step ST3, the sign of the time differential of the front wheel $d\delta_f/dt$ is compared with that of the previous value, and it is determined if the sign has changed at the current control cycle. When step ST2 was reached for the first time, as there is no previous value, it is assumed that the sign of the yaw rate $\gamma$ is the same as the previous value or that there has been no change in the sign in step ST2. Also when step ST3 is reached for the first time, again, as there is no previous value, it is assumed that the sign of the time differential of the front wheel $d\delta_f/dt$ is the same as that of the previous value in step ST3.

If there was a change of sign in step ST3 (step ST3: yes), a counter is incremented (step ST4), and the program flow returns to step ST2. When there was no change in the sign of the time differential of the front wheel $d\delta_f/dt$ in step ST3 (step ST3: no), the counter is bypassed. By repeating this process, the total number of changes in the steering direction, for instance, when turning a curve can be obtained as a count value.

In step ST2, if the sign of the current value of the yaw rate $\gamma$ is the same as that of the previous value and the absolute value of the yaw rate $\gamma$ is greater than the second threshold value $\gamma_{th2}$, the number of changes in the steering direction is divided by a time period during which the sign thereof remained the same, and this figure (tabulated figure) is stored in step ST5. In step ST6, the current tabulated figure is added to the average value of the preceding tabulated figures to obtain a new average value of the tabulated figures. If desired, the oldest tabulated figure may be deleted at this time. In this way, the skill of the vehicle operator is evaluated by an average value of the number of changing the steering direction during a time period when the absolute value of the yaw rate of the vehicle continues to be above a prescribed level. In step ST7, depending on the new average value of the tabulated figures or the skill of the vehicle operator, the response property is selected. The count of the counter, and the previous values of the yaw rate and time differential of the front wheel steering angle are reset in step ST8.

Figure 4:
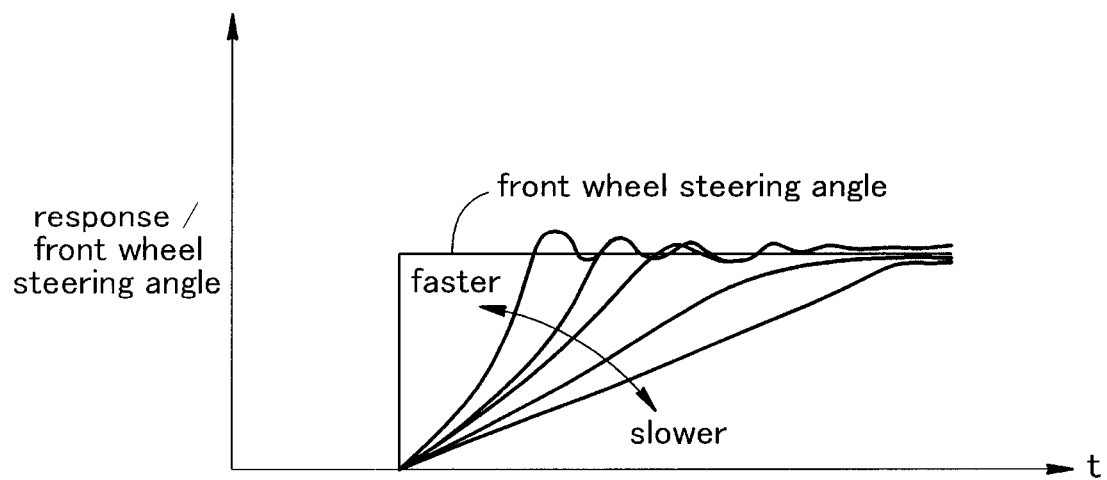
FIG. 4 is a graph showing five categories of response properties for a steering step input.
Figure 5:
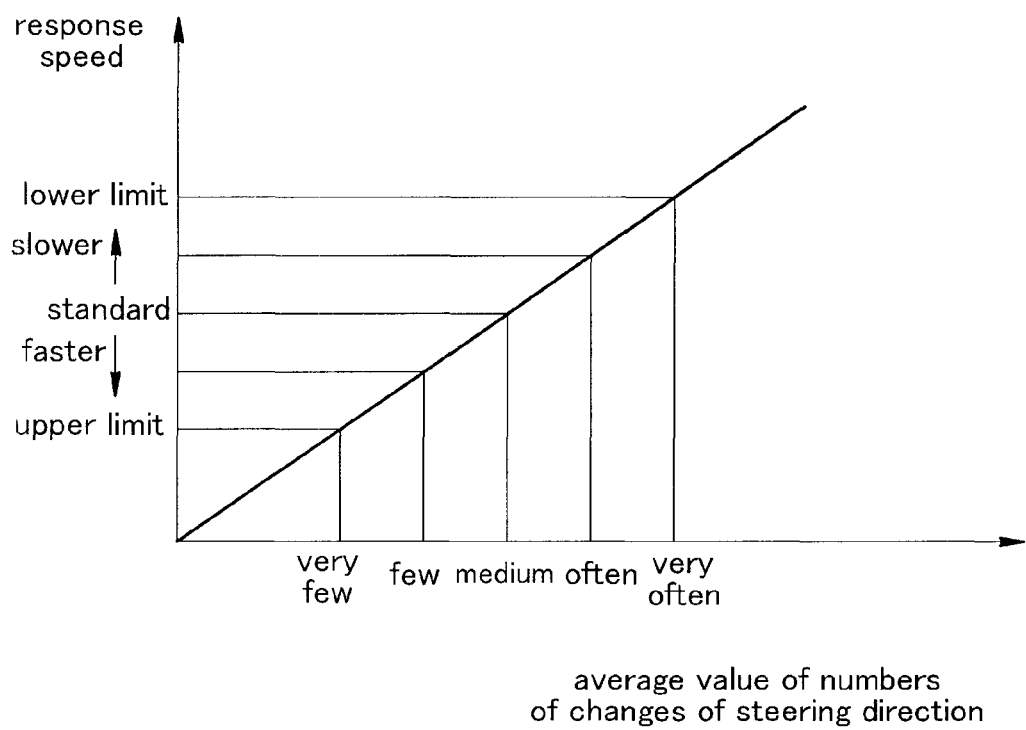
FIG. 5 is a graph showing the relationship between five different categories of response speed and the number of changes in the steering direction.

FIG. 4 is a conceptual representation of various response properties of the vehicle to a steering step input which are associated with five categories of the response property of an ideal vehicle model 10. The model when demonstrating a slower response produces a yaw rate for a given steering step input with a relatively large delay. The model when demonstrating a faster response produces a yaw rate for a given steering step input with a relatively small delay, but involves some overshoot. FIG. 5 is a graph showing the relationship between the evaluated skill of the vehicle operator and five categories of the response speed of the ideal vehicle model 10, which is related in a linear fashion in this particular example.

According to the foregoing embodiment, every time a cornering event occurs, the number of changes in the steering direction is averaged over time for the duration of the cornering event. The larger the number of changes in the steering direction is, the lower the driving skill of the vehicle operator is. Conversely, the smaller the number of changes in the steering direction is, the higher the driving skill of the vehicle operator is. Thus, when the number of changes in the steering direction is medium, an intermediate response speed is selected. The lower the skill of the vehicle operator is as indicated by a large number of changes in the steering direction during each cornering event, the slower the response speed is adjusted. The higher the skill of the vehicle operator is as indicated by a small number of changes in the steering direction during each cornering event, the faster the response speed is adjusted. Because there is an upper and lower limit to the response speed that can be selected, the response speed is prevented from becoming excessively high or low. Also, the vehicle control of the foregoing embodiment was based on a feed forward control, but the present invention is applicable to that based on a feedback control with suitable changes.

Although the present invention has been described in terms of a preferred embodiment thereof, it is obvious to a person skilled in the art that various alterations and modifications are possible without departing from the scope of the present invention which is set forth in the appended claims.

For instance, a RTC device was used in the foregoing embodiment for applying an additional yaw moment to the vehicle, but other devices may also be used for a similar purpose. Such devices include, not exclusively, a right and left wheel traction distribution device, a right and left wheel braking force distribution device and an additive front wheel steering control device using a steer-by-wire arrangement or a mechanical gear system.

The contents of the original Japanese patent application on which the Paris Convention priority claim is made for the present application are incorporated in this application by reference.

The invention claimed is:

1. A vehicle driveability control system for determining a yaw moment as a control variable that is applied to a vehicle for a given control input including a front wheel steering angle according to a response of an ideal vehicle model to the given input, comprising:
    a vehicle operator skill determining unit;
    a control unit adapted for changing a parameter of the ideal vehicle model according to an output of the vehicle operator skill determining unit; and
    a feed forward control unit that is adapted to determine the control variable according to a deviation of an output of an actual vehicle model from an output of the ideal vehicle model,
    wherein the vehicle operator skill determining unit is adapted to evaluate a skill of a vehicle operator by an average value of a number of changing steering directions during a time period when an absolute value of a yaw rate of the vehicle continues to be above a prescribed level.

2. The vehicle driveability control system according to claim 1, wherein the vehicle operator skill determining unit comprises a corrective steering determining unit to count a number of changes in a sign of a steering speed while a yaw movement of the vehicle continues with a same sign.

3. The vehicle driveability control system according to claim 1, wherein the vehicle comprises a rear toe control unit for applying the yaw moment to the vehicle as the control variable.

* * * * *